United States Patent
Tanimoto et al.

(10) Patent No.: US 9,079,607 B2
(45) Date of Patent: Jul. 14, 2015

(54) VEHICLE STEERING CONTROL APPARATUS

(75) Inventors: Mitsutaka Tanimoto, Susono (JP); Takahiro Kojo, Gotenba (JP); Yoshiaki Tsuchiya, Miyoshi (JP); Yoshitaka Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 13/990,958

(22) PCT Filed: Dec. 1, 2010

(86) PCT No.: PCT/JP2010/071512
§ 371 (c)(1),
(2), (4) Date: Aug. 8, 2013

(87) PCT Pub. No.: WO2012/073359
PCT Pub. Date: Jun. 7, 2012

(65) Prior Publication Data
US 2013/0311045 A1 Nov. 21, 2013

(51) Int. Cl.
*B62D 5/04* (2006.01)
*B62D 15/02* (2006.01)

(52) U.S. Cl.
CPC .............. *B62D 5/0466* (2013.01); *B62D 5/046* (2013.01); *B62D 5/049* (2013.01); *B62D 5/0481* (2013.01); *B62D 15/0245* (2013.01)

(58) Field of Classification Search
CPC ...... B62D 5/04; B62D 5/0457; B62D 5/0466; B62D 5/0481; B62D 5/049
See application file for complete search history.

(56) References Cited

U.S. PATENT DOCUMENTS

| 5,754,966 A * | 5/1998 | Ichikawa et al. ................ 701/41 |
| 5,810,108 A * | 9/1998 | Jung et al. ....................... 180/404 |
| 2006/0070794 A1 | 4/2006 | Fujita et al. |

FOREIGN PATENT DOCUMENTS

| JP | 2006 103390 | 4/2006 |
| JP | 2009 262837 | 11/2009 |
| JP | 2010 214995 | 9/2010 |

OTHER PUBLICATIONS

International Search Report issued Mar. 15, 2011 in PCT/JP11/071512 filed Dec. 1, 2010.

* cited by examiner

*Primary Examiner* — Thomas Tarcza
*Assistant Examiner* — Kevin Myhre
(74) *Attorney, Agent, or Firm* — Oblon, McClelland, Maier & Neustadt, L.L.P.

(57) ABSTRACT

A vehicle steering control apparatus in a vehicle including an apparatus changing a tire steer angle independently of steering wheel operation; a detecting device detecting a tire steer angle equivalent value corresponding to the tire steer angle; and a controller is provided. The controller is configured to learn a steering wheel angle neutral point; determine if the detecting device is in an abnormal state; disregard the learned steering wheel angle neutral point if the detecting device is in the abnormal state; control the apparatus such that the tire steer angle is returned to a tire steer angle neutral point if the detecting device is in the abnormal state; initialize the detecting device after the tire steer angle is returned to the tire steer angle neutral point; and restart the learning of the steering wheel angle after the detecting device is initialized.

6 Claims, 5 Drawing Sheets

VEHICLE STEERING CONTROL APPARATUS

TECHNICAL FIELD

The present invention relates to a vehicle steering control apparatus which is configured to control a steering state of a vehicle which is provided with various tire steer angle varying apparatuses which are configured to control a tire steer angle independently of steering operation, such as variable gear ratio steering (VGRS), active rear steering (ARS), all wheel steering (AWS) or steer by wire (SWB).

BACKGROUND ART

As this type of apparatus, there has been suggested an apparatus which operates or calculates a tire steer angle midpoint (e.g. refer to Patent document 1). According to an electric power steering apparatus disclosed in the Patent document 1, a straight-travel state of the vehicle is accurately determined on the basis of a steering wheel angle, a vehicle speed, and a rack bar axial force. Thus, even if steering torque is applied such that a driver returns a steering wheel to a neutral position due to a deviated tire steer angle midpoint, a control tire steer angle midpoint can be accurately determined as a point of reference for detecting a rotation angle of a steering shaft.

Moreover, Patent document 2 discloses a technology of automatic driving of the vehicle along a target trajectory, as a technology to which this type of apparatus can be applied.

PRIOR ART DOCUMENT

Patent Document

Patent document 1: Japanese Patent Application Laid Open No. 2006-103390
Patent document 2: Japanese Patent Application Laid Open No. 2009-262837

DISCLOSURE OF INVENTION

Subject to be Solved by the Invention

In a state in which the reliability of a sensor which detects the tire steer angle or an equivalent value thereof is reduced for some reasons, the reliability of a tire steer angle neutral point (corresponding to the aforementioned "tire steer angle midpoint") which is operated on the basis of a detection value of the sensor is significantly reduced.

On the other hand, in the state in which the reliability of the tire steer angle neutral point is reduced as described above, the reliability of a steering wheel angle neutral point (corresponding to the aforementioned "control tire steer angle midpoint") is also reduced. The steering wheel angle neutral point is a reference point of the steering wheel angle and is a reference value of broad vehicle motion control which is not relevant to whether or not the steering wheel varying device is used together. Thus, if the reliability of the tire steer angle neutral point is reduced, it is necessary to quickly relearn the steering wheel angle neutral point.

By the way, the Patent document 1 describes that as a condition and timing in relearning the steering wheel angle neutral point, the control tire steer angle midpoint (i.e. the steering wheel angle neutral point) stored in the case of a bad power supply state from a battery is deleted in parking.

However, a learning accuracy and a learning speed associated with the relearning of the steering wheel angle neutral point are likely reduced if a learning value stored at that time point is disregarded only on the condition that the reliability of the steering wheel angle neutral point is not ensured. For example, if the accuracy of the tire steer angle neutral point continues to be low even after the learning value is disregarded, the accuracy of the relearned steering wheel angle neutral point is not always ensured. In other words, conventional apparatuses including the apparatus disclosed in the Patent document 1 have such a technical problem that it is hard to sufficiently ensure the reliability of the steering wheel angle neutral point.

In view of the aforementioned problems, it is therefore an object of the present invention to provide a vehicle steering control apparatus which enables the steering wheel angle neutral point to be learned, highly accurately.

Means for Solving the Subject

The above object of the present invention can be achieved by a vehicle steering control apparatus in a vehicle, the vehicle comprising: a tire steer angle varying apparatus which is configured to change a tire steer angle of steered wheels including at least one of front wheels and rear wheels, independently of steering wheel operation; and a tire steer angle equivalent value detecting device which is configured to detect a tire steer angle equivalent value corresponding to the tire steer angle, the tire steer angle equivalent value providing an operational criterion for the tire steer angle varying apparatus, said vehicle steering control apparatus comprising: a learning device which is configured to learn a steering wheel angle neutral point; an abnormality determining device which is configured to determine whether or not the tire steer angle equivalent value detecting device is in an abnormal state; a disregarding device which is configured to disregard the learned steering wheel angle neutral point if it is determined that the tire steer angle equivalent value detecting device is in the abnormal state; a controlling device which is configured to control the tire steer angle varying apparatus such that the tire steer angle is returned to a tire steer angle neutral point if it is determined that the tire steer angle equivalent value detecting device is in the abnormal state; and an initializing device which is configured to initialize the tire steer angle equivalent value detecting device after the tire steer angle is returned to the tire steer angle neutral point, wherein said leaning device restarts the learning of the steering wheel angle after the tire steer angle equivalent value detecting device is initialized (claim 1).

The tire steer angle varying apparatus of the present invention can preferably include, for example, VGRS if the front wheels are the steered wheels, ARS if the rear wheels are the steered wheels, AWS if the four wheels are the steered wheels, and the like. Incidentally, the expression, "which is configured to change a tire steer angle . . . independently of steering wheel operation", does not exclude tire steer angle control linked to the steering wheel operation (including an unambiguous tire steer angle change by a steering mechanism mechanically coupled, and an appropriate tire steer angle assist according to the steering wheel operation).

The tire steer angle equivalent value of the present invention means a physical quantity, a controlled variable or control amount, or an index value which corresponds to the tire steer angle of the steered wheels in a one-to-one, one-to-many, many-to-one, or many-to-many manner, or which corresponds to the tire steer angle of the steered wheels in an unambiguous or ambiguous manner, and which provides the operational criterion for the tire steer angle varying apparatus. The tire steer angle equivalent value preferably means, for example, a VGRS relative angle, an ARS relative angle, and the like, which make a pair with the tire steer angle varying apparatus. Alternatively, the tire steer angle equivalent value may mean, for example, the tire steer angle itself. Incidentally, the expression, "which provides the operational criterion", means to provide a criterion for a physical operational state and a physical operation quantity of the tire steer angle varying apparatus.

The vehicle steering control apparatus of the present invention can adopt forms of various computer systems or the like, such as, for example, various processing units like a single or a plurality of electronic control units (ECU), various controllers, or microcomputer apparatuses, which can include one or a plurality of central processing units (CPU), micro processing units (MPU), various processors, various controllers, or various memory devices, such as a read only memory (ROM), a random access memory (RAM), a buffer memory, or a flash memory, if necessary.

According to the vehicle steering control apparatus of the present invention, the steering wheel angle neutral point is learned by the learning device. The steering wheel angle neutral point is a zero point of the steering wheel angle, and means the steering wheel angle when the vehicle is maintained in the straight-travel state. In other words, preferably, it is considered that active or positive steering operation by a driver (excluding what is similar to steering-holding operation) is not performed at the steering wheel angle neutral point.

Incidentally, the learning means a comprehensive process including various detection, calculation, or estimation processing, which is performed with a regular or irregular period in order to ensure the practical reliability of an objective value, and storage and disregard of a value obtained by the aforementioned processing, and the like. There is no limitation in practical aspects of the leaning. For example, the learning device may perform the learning by obtaining the steering wheel angle in a case where the vehicle is in the straight-travel state or in a case where the vehicle is estimated to be in the straight-travel state, as a sample value of the steering wheel angle neutral point (i.e. zero point), by holding a predetermined number of sample values which are obtained with a regular or irregular period, and by performing various arithmetic processing (which can include averaging, weighting, etc.) on the held sample values to update the steering wheel angle neutral point. Moreover, even in the straight-travel state, as long as the driver holds the steering wheel steering wheel, fluctuation can occur to some extent. The steering wheel angle leaning device may learn the steering wheel angle neutral point to some extent in accordance with the occurrence of this type of fluctuation.

The tire steer angle varying apparatus usually determines the steering wheel neutral point on the bass of the tire steer angle equivalent value which is detected by the tire steer angle equivalent value detecting device, and uses the steering wheel neutral point as a standard in actually operating the tire steer angle control. The tire steer angle neutral point means the tire steer angle equivalent value in the straight-travel state. If the driver's steering operation is not detected, or if a steering operation amount or manipulated variable is within a predetermined range, or in similar cases, then, the tire steer angle varying apparatus can preferably maintain a steering state of the vehicle, for example, by controlling the tire steer angle equivalent value to the tire steer angle neutral point.

By the way, the tire steer angle equivalent value detecting device may fall into various abnormal states (which may include various states such as a state in which a detection value exceeds a normal range, a state in which the detection value diverges, a state in which the detection value is an invalid value, a state in which the value is not detected, a state in which output is unstable, or a state in which the output is hunting), as a state in which a predetermined or higher degree of reliability of the detection value is hardly ensured, regardless of temporarily or permanently. If the tire steer angle equivalent value detecting device is in the abnormal state, the reliability of the tire steer angle neutral point decreases to the extent that cannot be ignored in practice, to a greater or lesser degree. If the reliability of the tire steer angle neutral point decreases, the tire steer angle of the steered wheels deflects to the left or to the right at the tire steer angle neutral point at which the vehicle is supposed to be in the straight-travel state, and the vehicle thus deviates from the straight-travel state.

On one hand, in the situations as described above, the driver highly likely tries to modify the state of the vehicle to the straight-travel state by performing the steering operation to apply the steering torque to the steering shaft, as occasion demands. In this case, the steering wheel angle neutral point learned by the steering wheel angle neutral point learning device described above deviates from the original steering wheel angle neutral point. As a result, the reliability of the learning value of the steering wheel angle neutral point is also reduced. In view of this, if it is determined that the tire steer angle equivalent value detecting device is in the abnormal state, it is necessary to disregard once the learning value of the steering wheel angle neutral point and to start the learning again.

On the other hand, the presence or absence of the abnormal state can be determined under various practical aspects in accordance with a definition of the abnormal state. If, however, the learning value of the steering wheel angle neutral point is disregarded simply on the condition that the tire steer angle equivalent value detecting device is in the abnormal state and if the learning of the steering wheel angle is newly started, it is hard to exclude the possibility that the abnormal state of the tire steer angle equivalent value detecting device influences the learning of the steering wheel angle neutral point which is newly started. As a result, learning accuracy of the steering wheel angle neutral point which is relearned is reduced, and at least, there is the possibility that a time loss until the obtainment of the steering wheel angle neutral point which is reliable, and a quality loss in the steering control of the vehicle until the obtainment of the reliable steering wheel angle neutral point are actualized.

According to the vehicle steering control apparatus of the present invention, the tire steer angle varying apparatus is controlled by the controlling device such that the tire steer angle of the steered wheels is returned to the tire steer angle neutral point if it is determined that the tire steer angle equivalent value detecting device is in the abnormal state as described above. Here, the tire steer angle neutral point, which is a control target of the controlling device, is the tire steer angle neutral point which is not influenced by the abnormal state of the tire steer angle equivalent value detecting device, and means, for example, the tire steer angle corresponding to an initial position of the tire steer angle equivalent value detecting device, or the like. For example, in this case, an influence on the tire steer angle neutral point by wheel alignment, an abrasion state of tires, mechanical performance characteristics of the steering mechanism, and the like which can change with time is hardly compensated; however, at least, the straight-travel state having no problem on a practical operation side is realized. Alternatively, the tire steer angle neutral point, which is the control target of the controlling device, may be a practical tire steer angle position at which it is determined that the vehicle is in the straight-travel state by determination processing based on a yaw rate of the vehicle, a yaw deviation, a vehicle body slip angle, lateral acceleration, and the like. In any case, the vehicle is temporarily maintained in the straight-travel state by the action of the controlling device.

On the other hand, when the straight-travel state is temporarily obtained as described above, the tire steer angle equivalent value detecting device is initialized by the initializing device. Initialization means to newly start the detection of the tire steer angle equivalent value, with the detection value at that time point as the zero point, i.e. the tire steer angle neutral point.

Here, the leaning device described above is configured to restart the learning of the steering wheel angle neutral point after the disregard of the learning value of the steering wheel angle neutral point, on the condition that the initialization of the tire steer angle equivalent value detecting device has been completed.

By defining the learning restart condition of the steering wheel angle neutral point as described above, the learning of the steering wheel angle neutral point after the disregard of the previous learning value is restarted in a state in which the provisional straight-travel state is obtained by the action of the controlling device and in a state in which the normal detection processing of the tire steer angle equivalent value is restarted by the action of the initializing device. Therefore, the learning of the steering wheel angle neutral point is started on an ideal condition, which enables the steering wheel angle neutral point to be learned, quickly and highly accurately.

Incidentally, such a practically useful effect that is unique to the present invention is ensured by starting the learning of the steering wheel angle neutral point after the initialization of the tire steer angle equivalent value detecting device has been completed; however, it may be better that the situation in which the steering wheel angle neutral point is disregarded does not last long from the viewpoint of maintaining the stable steering state of the vehicle. In view of that point, it is also desirable that timing in which the disregarding device disregards the learning value of the steering wheel angle neutral point is set after the initialization of the tire steer angle equivalent value detecting device has been completed.

In one aspect of the vehicle steering control apparatus of the present invention, the vehicle further comprises a neutral position detecting device which is configured to detect a neutral position of the tire steer angle equivalent value detecting device corresponding to the tire steer angle neutral point, and said controlling device returns the tire steer angle to the tire steer angle neutral point on the basis of the detected neutral position (claim 2).

According to this aspect, the neutral position of the tire steer angle equivalent value detecting device detected by the neutral position detecting device can be used when the controlling device returns the tire steer angle of the steered wheels to the tire steer angle neutral point, and thus, the processing associated with the steering wheel angle neutral point learning can be restarted quickly.

In another aspect of the vehicle steering control apparatus of the present invention, said controlling device controls the tire steer angle varying apparatus such that the tire steer angle is returned to the tire steer angle neutral point within a predetermined time (claim 3).

According to this aspect, the tire steer angle can be returned to the tire steer angle neutral point within the predetermined time when it is determined that the tire steer angle equivalent value detecting device is abnormal. Therefore, in comparison with a case where the tire steer angle is left to chance to return to the tire steer angle neutral point, time variations of a series of return processing are suppressed when it is determined that the tire steer angle equivalent value detecting device is abnormal, and there is an effect on quality improvement.

Here, in particular, a technical meaning of returning the tire steer angle to the tire steer angle neutral point within the predetermined time becomes clearer if the predetermined time is set on the basis of certain types of restrictions and legal reasons. For example, there are known various behavior stabilization controls for the vehicle using the steering wheel angle neutral point as a reference value in terms of control, such as vehicle stability control (VSC). In view of situations in which legal restrictions are required or obligated in a period in which the various behavior stabilization controls of those types cannot be performed, such as, for example, a situation in which the lighting of a warning lamp (WL) is required or obligated if the control incapable period as described above continues for a predetermined or longer time, it is extremely useful and reasonable in practice to take measures, such as avoiding the lighting of the WL as much as possible, from the viewpoint of a mental burden given by the lighting of the WL to the driver.

For example, in terms of the restrictions exemplified herein, the "predetermined time" in this aspect may be a grace time obtained by subtracting a time required to derive the learning value of the steering wheel angle neutral position by the steering wheel angle neutral point leaning, from the predetermined time as the legal restrictions.

In another aspect of the vehicle steering control apparatus of the present invention, the vehicle steering control apparatus further comprises a determining device which is configured to determine a change rate of the tire steer angle when the tire steer angle is returned to the tire steer angle neutral point on the basis of at least one of a steering wheel operating speed and a vehicle speed, wherein said controlling device controls the tire steer angle varying apparatus such that the tire steer angle is changed at the determined change rate (claim 4).

The tire steer angle control toward to the tire steer angle neutral point which is performed by the controlling device is a kind of a forced control, and this control is independent of the sensitivity and the intention of the driver. Therefore, in some case, the situation is considered such that a sense of discomfort or a discomfort is given to the driver by this control.

According to this aspect, the change rate of the tire steer angle when the controlling device controls the tire steer angle toward to the tire steer angle neutral point is limited on the basis of at least one of the steering wheel operating speed (which may be, for example, a time differential value of the steering wheel angle detected by a steering wheel angle sensor) and the vehicle speed.

More specifically, in a situation in which the steering wheel operating speed is relatively high, an influence of the tire steer angle control by the controlling device on the driver's sensitivity and feelings is generally small, and thus, the change rate of the tire steer angle can be set relatively high. Moreover, in a situation in which the vehicle speed is relatively high, an influence of a tire steer angle change on vehicle behavior is relatively large, and it is thus better that the change rate of the tire steer angle is relatively low. Incidentally, the change rate of the tire steer angle may be set such that the steering angel can be returned to the tire steer angle neutral point as quickly as possible without providing the driver with an uncomfortable feeling and an uneasy feeling, experimentally, experientially, or theoretically in advance.

In another aspect of the vehicle steering control apparatus of the present invention, the vehicle steering control apparatus further comprises an automatic steering controlling device which is configured to control the tire steer angle varying apparatus such that the vehicle is in an automatic steering state on the basis of a driving condition set in advance; and a straight-travel determining device which is configured to determine whether or not the vehicle is in a straight-travel state, wherein said disregarding device disregards the learned steering wheel angle neutral point if it is determined that the vehicle is in the straight-travel state in a case where it is determined that the tire steer angle equivalent value detecting device is in the abnormal state in an automatic steering period in which the vehicle is in the automatic steering state, and said controlling device returns the tire steer angle to the tire steer angle neutral point if it is determined that the vehicle is in the straight-travel state in the case where it is determined that the tire steer angle equivalent value detecting device is in the abnormal state in the automatic steering period in which the vehicle is in the automatic steering state (claim 5).

According to this aspect, the vehicle moves into the automatic steering state on the basis of the driving condition set in advance by the automatic steering controlling device. The automatic steering state means a travel state which does not require the driver's active or positive steering operation. The control of the tire steer angle varying apparatus toward this type of automatic steering state performed by the automatic steering controlling device may be control for making the vehicle trace a target driving route, such as, for example, lane keeping assist (LKA).

Incidentally, a practical control aspect of the automatic steering controlling device associated with the automatic steering state as described above is various, and is not defined unambiguously. However, for example, the vehicle may be introduced into the automatic steering state by changing a controlled variable or control amount of the tire steer angle varying apparatus in accordance with a position state deviation (e.g. a lateral position deviation, a yaw angle deviation, etc.) which defines a positional relation between a vehicle body and a white line or a lane mark for defining the target driving route.

By the way, in the automatic steering state, the driver does not have an active or positive steering intention, and the state of the vehicle can be not only the straight-travel state but also a turning state. Therefore, if the tire steer angle is returned to the tire steer angle neutral point by the action of the controlling device in a case where it is determined that the tire steer angle equivalent value detecting device is abnormal in the automatic steering period in which the vehicle is in the automatic steering state, it significantly influences the vehicle behavior. Of course, at the same time, it can increase the driver's mental burden, and can make the driver feel uncomfortable, uneasy, or unpleasant.

Moreover, in some automatic steering control for maintaining the vehicle in the automatic steering state, the steering wheel angle neutral point is required as control information. Thus, if the steering wheel angle neutral point is disregarded when it is determined that the tire steer angle equivalent value detecting device is abnormal, the automatic steering control does not apply, thereby reducing the stability of the vehicle behavior.

According to this aspect, if it is determined by the straight-travel determining device that the vehicle is in the straight-travel state in the automatic steering period, the learning value of the steering wheel angle neutral point is disregarded and the control of the tire steer angle by the controlling device is allowed. Therefore, it is prevented that the vehicle behavior is destabilized and that the uncomfortable feeling, the uneasy feeling, or the unpleasant feeling is given to the driver, and thus, high-quality steering control is provided.

Incidentally, the straight-travel determination of the straight-travel determining device can be performed, relatively simply, for example, by comparing the yaw rate and a threshold; however, the vehicle state which can be determined to be the straight-travel state by the straight-travel determination does not always have to match the straight-travel state which can be obtained by the tire steer angle control toward the tire steer angle neutral point associated with the controlling device. More specifically, as long as the aforementioned problems are not actualized when the tire steer angle is returned to the tire steer angle neutral point by the controlling device, the straight-travel state which is determined by the straight-travel determining device can include a relatively small degree of turning state.

The operation and other advantages of the present invention will become more apparent from embodiments explained below.

MODES FOR CARRYING OUT THE INVENTION

Hereinafter, various embodiments of the vehicle steering control apparatus of the present invention will be explained with reference to the drawings, as occasion demands.

First Embodiment

Configuration of Embodiment

Figure 1:
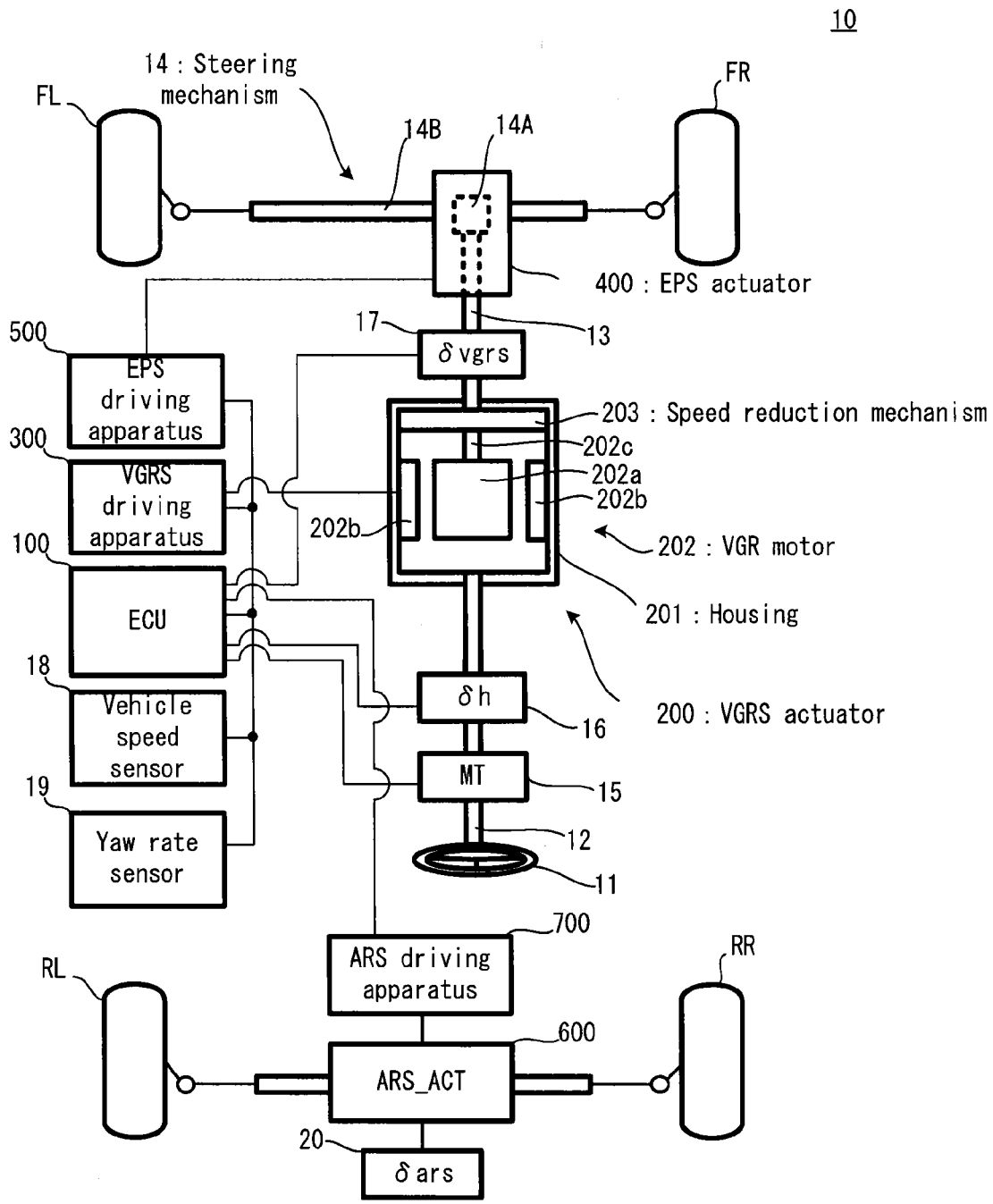
FIG. 1 is a schematic configuration diagram conceptually showing a configuration of a steering system in a vehicle in a first embodiment of the present invention.

Firstly, with reference to FIG. 1, a configuration of a vehicle 10 in a first embodiment of the present invention will be explained. FIG. 1 is a schematic configuration diagram conceptually showing a configuration of a steering system in the vehicle 10.

In FIG. 1, the vehicle 10 is provided with a left-and-right pair of front wheels FL and FR and a left-and-right pair of rear wheels RL and RR, as steered wheels. The vehicle 10 is configured to move in a desired direction by steering each of the steered wheels toward the left or right. The vehicle 10 is provided with an ECU 100, a VGRS actuator 200, a VGRS driving apparatus 300, an EPS actuator 400, an EPS driving apparatus 500, an ARS actuator 600, and an ARS driving apparatus 700.

The ECU 100 is provided with a central processing unit (CPU), a read only memory (ROM), and a random access memory (RAM), each of which is not illustrated, and it is an electronic control unit which is configured to control the entire operation of the vehicle 10. The ECU 100 is one example of the "vehicle steering control apparatus" of the present invention. The ECU 100 is configured to perform steering wheel angle neutral point control described later, in accordance with a control program stored in the ROM.

Incidentally, the ECU 100 is a unified electronic control unit which is configured to function as one example of each of the "learning device", the "abnormality determining device", the "disregarding device", the "controlling device", and the "initializing device" of the present invention, and the operation of each of the devices is performed by the ECU 100. However, the physical, mechanical, and electrical configurations of each of the devices of the present invention are not limited to this example, and for example, each of the devices may be configured as various computer systems or the like, such as a plurality of ECUs, various processing units, various controllers, or microcomputer apparatuses.

In the vehicle 10, a steering input given by a driver via a steering wheel 11 as a steering input device is transmitted to an upper steering shaft 12 as a shaft body which is coaxially rotatably coupled with the steering wheel 11 and which can rotate in the same direction as that of the steering wheel 11. The upper steering shaft 12 is coupled with the VGRS actuator 200 at an end thereof on the downstream side.

The VGRS actuator 200 is one example of the "tire steer angle varying apparatus" which is provided with a housing 201, a VGRS motor 202, and a speed reduction mechanism (or reduction gear mechanism) 203.

The housing 201 is a case or enclosure of the VGRS actuator 200 which accommodates the VGRS motor 202 and the speed reduction mechanism 203. To the housing 201, the downstream end of the upper steering shaft 12 described above is fixed. The housing 201 can rotate integrally with the upper steering shaft 12.

The VGRS motor 202 is a DC brushless motor having a rotor 202a as a rotator, a stator 202b as a stationary part, and a rotating shaft 202c as a shaft for outputting a driving force. The stator 202b is fixed to the inside of the housing 201, and the rotor 202a is rotatably held within the housing 201. The rotating shaft 202c is coaxially rotatably fixed to the rotor 202a. The rotating shaft 202c is coupled with the speed reduction mechanism 203 at an end thereof on the downstream side.

The speed reduction mechanism 203 is a planetary gear mechanism having a plurality of rotational elements which can perform differential rotation (a sun gear, a carrier, and a ring gear). Out of the plurality of rotational elements, the sun gear which is a first rotational element is coupled with the rotating shaft 202c of the VGRS motor 202, and the carrier which is a second rotational element is coupled with the housing 201. The ring gear which is a third rotational element is coupled with a lower steering shaft 13.

According to the speed reduction mechanism 201 having such a configuration, a rotational speed of the upper steering shaft 12 according to an operation amount or manipulated variable of the steering wheel 11 (i.e. a rotational speed of the housing 201 coupled with the carrier) and a rotational speed of the VGRS motor 202 (i.e. a rotational speed of the rotating shaft 202c coupled with the sun gear) unambiguously determine a rotational speed of the lower steering shaft 13 coupled with the ring gear which is the remaining one rotational element. At this time, it is possible to control an increase and a reduction in the rotational speed of the lower steering shaft 13 by controlling an increase and a reduction in the rotational speed of the VGRS motor 202 by means of the differential action between the rotational elements. In other words, the upper steering shaft 12 and the lower steering shaft 13 can relatively rotate by the action of the VGRS motor 202 and the speed reduction mechanism 203. Moreover, in terms of the configuration of each rotational element in the speed reduction mechanism 203, the rotational speed of the VGRS motor 202 is transmitted to the lower steering shaft 13 in a state of being reduced in accordance with a predetermined reduction ratio which is determined in accordance with a gear ratio between the rotational elements.

As described above, in the vehicle 10, since the upper steering shaft 12 and the lower steering shaft 13 can relatively rotate, a steering transmission ratio K is continuously variable in a range set in advance, where the steering transmission ratio K is a ratio between a steering wheel angle δh, which is the amount of rotation of the upper steering shaft 12, and a front wheel tire steer angle δf of the front wheels as one of the wheels, which is unambiguously determined according to the amount of rotation of the lower steering shaft 13 (which is also related to a gear ratio of a rack and pinion mechanism described later).

In other words, the VGRS actuator 200 can change a relation between the steering wheel angle δh and the front wheel tire steer angle δf, and can change the front wheel tire steer angle δf independently of the steering input by the driver.

Incidentally, the speed reduction mechanism 203 may have not only the planetary gear mechanism exemplified here but also another aspect (e.g. an aspect in which the upper steering shaft 12 and the lower steering shaft 13 are relatively rotated by coupling therewith gears each of which has the different number of teeth, by providing a flexible gear which is in contact with the each gear in one portion, and by rotating the flexible gear due to motor torque transmitted via a wave generator, or similar aspects). Alternatively, the speed reduction mechanism 203 may have a physical, mechanical, or mechanistic aspect different from the aforementioned aspect even in the case of the planetary gear mechanism.

The VGRS driving apparatus 300 is an electric drive circuit which is configured to electrify the stator 202b of the VGRS motor 202 and which includes a PWM circuit, a transistor circuit, an inverter and the like. The VGRS driving apparatus 300 is electrically connected to a not-illustrated battery, and it is configured to supply a drive voltage to the VGRS motor 202 by using electric power supplied from the battery. Moreover, the VGRS driving apparatus 300 is electrically connected to the ECU 100, and the operation thereof is controlled by the ECU 100. Incidentally the VGRS driving apparatus 300 and the VGRS actuator 200 constitute one example of the "tire steer angle varying apparatus" of the present invention.

The rotation of the lower steering shaft 13 is transmitted to a steering mechanism 14.

The steering mechanism 14 is a so-called rack and pinion mechanism, and is a mechanism including a pinion gear 14A connected to a downstream end of the lower steering shaft 13 and a rack bar 14B in which gear teeth engaging with the gear teeth of the pinion gear 14A are formed. The steering mechanism 14 is configured to transmit a steering force to each of the front wheels via a tie rod and a knuckle (whose reference numerals are omitted) coupled with both ends of the rack bar 14B, by converting the rotation of the pinion gear 14A into a horizontal motion of the rack bar 14B in FIG. 1.

The EPS actuator 400 is a steering torque assisting apparatus which is provided with an EPS motor as a DC brushless motor including a not-illustrated rotor as a rotator to which a permanent magnet is attached, and a stator as a stationary part which surrounds the rotor. The EPS motor is configured to generate assist torque TA in a direction of rotation of the rotor, where the rotor is rotated by the action of a rotating magnetic field formed in the EPS motor due to the electrification to the stator via the EPS driving apparatus 500.

On the other hand, a not-illustrated reduction gear is fixed to a motor shaft as a rotating shaft of the EPS motor, and this reduction gear also directly or indirectly engages with the pinion gear 14A. Thus, the assist torque TA generated from the EPS motor functions as assist torque for assisting the rotation of the pinion gear 14A. The pinion gear 14A is coupled with the lower steering shaft 13 as described above, and the lower steering shaft 13 is coupled with the upper steering shaft 12 via the VGRS actuator 200. Therefore, steering torque MT applied to the upper steering shaft 12 is transmitted to the rack bar 14B in a form of being assisted, as occasion demands, by the assist torque TA, by which a driver's steering load is reduced.

The EPS driving apparatus 500 is an electric drive circuit which is configured to electrify the stator of the EPS motor and which includes a PWM circuit, a transistor circuit, an inverter and the like. The EPS driving apparatus 500 is electrically connected to a not-illustrated battery, and it is configured to supply a drive voltage to the EPS motor by using electric power supplied from the battery. Moreover, the EPS driving apparatus 500 is electrically connected to the ECU 100, and the operation thereof is controlled by the ECU 100.

On the other hand, the vehicle 10 is provided with various sensors including a steering torque sensor 15, a steering wheel angle sensor 16, and a VGRS rotation angle sensor 17.

The steering torque sensor 15 is a sensor which is configured to detect the steering torque MT applied via the steering wheel 11 from the driver. Explaining it more specifically, the upper steering shaft 12 has such a configuration that it is divided into an upstream part and a downstream part and that the parts are mutually coupled by using a not-illustrated torsion bar. To the both ends of the torsion bar on the upstream side and the downstream side, rings for detecting a rotational phase difference are fixed. The torsion bar is twisted in its rotational direction in accordance with steering torque transmitted via the upstream part of the upper steering shaft 12 when the driver of the vehicle 10 operates the steering wheel 11 (i.e. the driver steering torque MT), and the torsion bar is configured to transmit the steering torque to the downstream part while generating the twist. Therefore, upon the transmission of the steering torque, there is the rotational phase difference between the rings for detecting the rotational phase difference described above. The steering torque sensor 15 is configured to detect the rotational phase difference, to convert the rotational phase difference to the steering torque, and to output it as an electrical signal corresponding to the steering torque MT. The steering torque sensor 15 is electrically connected to the ECU 100, and the detected steering torque MT is referred to by the ECU 100 with a regular or irregular period.

The steering wheel angle sensor 16 is an angle sensor which is configured to detect the steering wheel angle $\delta h$, which indicates the amount of rotation of the upper steering shaft 12. The steering wheel angle sensor 16 is electrically connected to the ECU 100, and the detected steering wheel angle $\delta h$ is referred to by the ECU 100 with a regular or irregular period.

The VGRS rotation angle sensor 17 is a rotary encoder which is configured to detect a VGRS rotation angle $\delta vgrs$, which is a relative rotation angle between the lower steering shaft 13 and the housing 201 (which is equivalent to the upper steering shaft 12 in terms of the rotation angle) in the VGRS actuator 200. The VGRS rotation angle sensor 17 is electrically connected to the ECU 100, and the detected VGRS rotation angle $\delta vgrs$ is referred to by the ECU 100 with a regular or irregular period.

Incidentally, the VGRS rotation angle $\delta vgrs$ detected by the VGRS rotation angle sensor 17 corresponds to the front wheel tire steer angle $\delta f$ in a one-to-one manner by adding the VGRS rotation angle $\delta vgrs$ to the steering wheel angle $\delta h$. In other words, the VGRS rotation angle $\delta vgrs$ is one example of the "tire steer angle equivalent value" of the present invention, and the VGRS rotation angle sensor 17 is one example of the "tire steer angle equivalent value detecting device" of the present invention.

The vehicle 10 is provided with a vehicle speed sensor 18 and a yaw rate sensor 19.

The vehicle speed sensor 18 is a sensor which is configured to detect a vehicle speed V as the speed or velocity of the vehicle 10. The vehicle speed sensor 18 is electrically connected to the ECU 100, and the detected vehicle speed V is referred to by the ECU 100 with a regular or irregular period.

The yaw rate sensor 19 is a sensor which is configured to detect a yaw rate $\gamma$ as a turning speed of the vehicle 10. The yaw rate sensor 19 is electrically connected to the ECU 100, and the detected yaw rate $\gamma$ is referred to by the ECU 100 with a regular or irregular period.

The ARS actuator 600 is a rear wheel tire steer angle varying apparatus which is provided with a tire steer angle control rod, an ARS motor, a linear motion mechanism for converting the rotation of the ARS motor to a reciprocating motion, each of which is not illustrated. The ARS actuator 600 is one example of the "tire steer angle varying apparatus" of the present invention. The rear wheels RL and RR are coupled with both ends of the tire steer angle control rod via a support, such as a knuckle. If the tire steer angle control rod is stroked to the left or to the right by a driving force applied from the ARS motor, a rear wheel tire steer angle or changes in accordance with a stroke amount.

The ARS driving apparatus 700 is an electric drive circuit which is configured to electrify the ARS motor and which includes a PWM circuit, a transistor circuit, an inverter and the like. The ARS driving apparatus 700 is electrically connected to a not-illustrated battery, and it is configured to supply a drive voltage to the ARS motor by using electric power supplied from the battery. Moreover, the ARS driving apparatus 700 is electrically connected to the ECU 100, and the operation thereof is controlled by the ECU 100.

The vehicle 10 is provided with an ARS rotation angle sensor 20. The ARS rotation angle sensor 20 is a rotary encoder which is configured to detect an ARS rotation angle $\delta ars$, which is a rotation angle of the ARS actuator accommodated in the ARS actuator 600. The ARS rotation angle sensor 20 is electrically connected to the ECU 100, and the detected ARS rotation angle $\delta ars$ is referred to by the ECU 100 with a regular or irregular period.

Incidentally, the ARS rotation angle $\delta ars$ detected by the ARS rotation angle sensor 20 corresponds to the rear wheel tire steer angle $\delta r$. In other words, the ARS rotation angle $\delta ars$ is one example of the "tire steer angle equivalent value" of the present invention, and the ARS rotation angle sensor 20 is another example of the "tire steer angle equivalent value detecting device" of the present invention.

Figure 2:
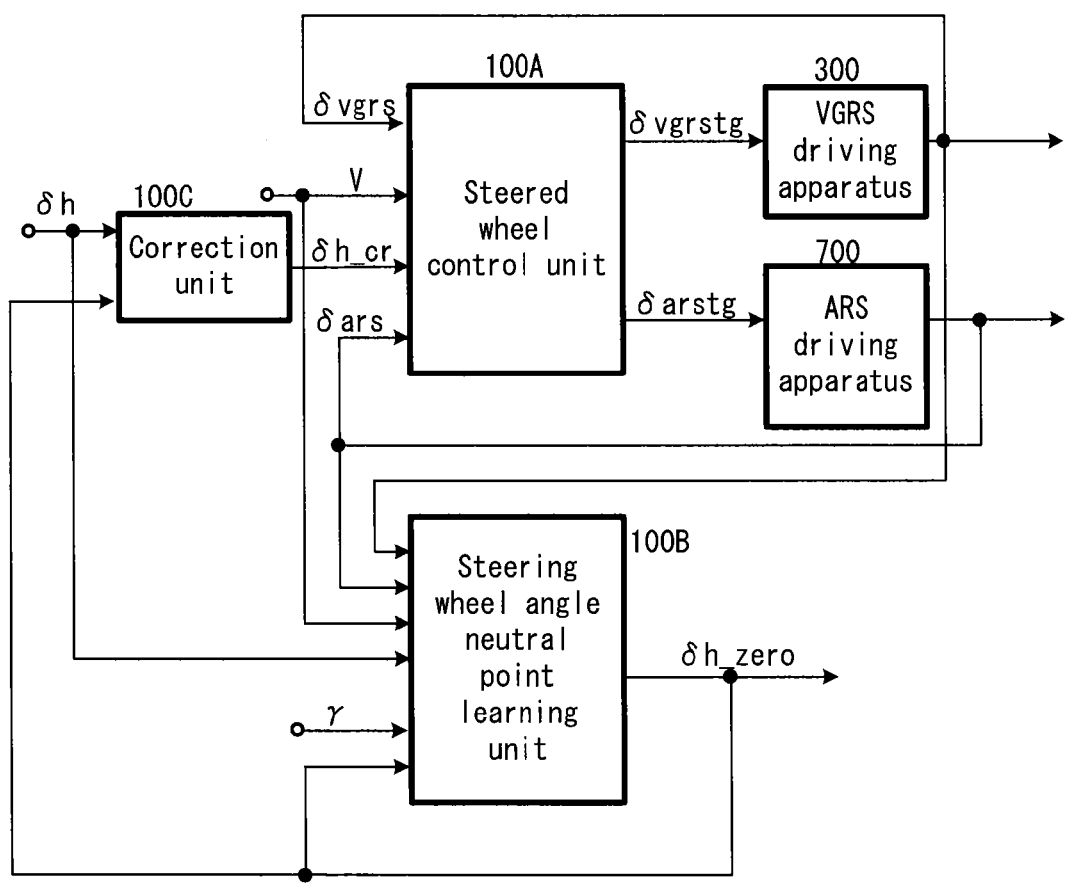
FIG. 2 is a block diagram associated with steering control in the vehicle illustrated in FIG. 1.

Next, with reference to FIG. 2, a further detailed configuration of the ECU 100 will be explained. FIG. 2 is a block diagram illustrating the steering control of the vehicle 10. Incidentally, in FIG. 2, portions overlapping those of FIG. 1 will carry the same reference numerals, and an explanation thereof will be omitted as occasion demands.

In FIG. 2, the ECU 100 is provided with a steered wheel control unit 100A, a steering wheel angle neutral point learning unit 100B, and a correction unit 100C.

The steered wheel control unit 100A is an apparatus which is configured to calculate a control variable or a control amount of the front wheels and the rear wheels which are the steered wheels.

More specifically, the VGRS rotation angle δvgrs, the vehicle speed V, the ARS rotation angle δars, and a correction steering wheel angle δh_cr descried later are inputted as input values, to the steered wheel control unit 100A. The steered wheel control unit 100A is configured to select a target VGRS rotation angle δvgrstg and a target ARS rotation angle δarstg corresponding to the input values from a VGRS rotation angle map and an ARS rotation angle map which are stored in the ROM in advance, respectively, and to output the selected target VGRS and AFS rotation angles as output values.

Incidentally, in the embodiment, the target VGRS rotation angle δvgrstg is calculated as a deviation for the VGRS rotation angle δvgrs at a current time point and is inputted to the VGRS driving apparatus 300. In the same manner, the target ARS rotation angle δarstg is calculated as a deviation for the ARS rotation angle δars at a current time point and is inputted to the ARS driving apparatus 700.

The steering wheel angle neutral point learning unit 100B is an apparatus which is configured to learn a steering wheel angle neutral point δh_zero, which is a neutral position of the steering wheel angle δh.

More specifically, the VGRS rotation angle δvgrs, the ARS rotation angle δars, the vehicle speed V, the steering wheel angle δh, the yaw rate γ, and the steering wheel angle neutral point δh_zero are inputted as input values, to the steering wheel angle neutral point learning unit 100B. The steering wheel angle neutral point learning unit 100B is configured to calculate the latest steering wheel angle neutral point δh_zero all the time from the input values, in accordance with a learning algorithm set in advance if the vehicle 10 is in a straight-travel state. Incidentally, various known aspects can be applied to the learning of the steering wheel angle neutral point, and thus, a detailed explanation thereof will be omitted here.

The correction unit 100C is an apparatus which is configured to calculate the correction steering wheel angle δh_cr, which is a net steering wheel operation amount or manipulated variable based on the driver's steering intention, by reducing the steering wheel angle neutral point δh_zero from the steering wheel angle δh. As described above, the steered wheel control unit 100A is configured to control the tire steer angles of the front and rear wheels on the basis of the correction steering wheel angle δh_cr.

Operation of Embodiment

Hereinafter, with reference to the drawings as occasion demands, as the operation of the embodiment, the steering wheel angle neutral point control performed by the ECU 100 will be explained.

<Outline of Steering Wheel Angle Neutral Point Control>

The steering wheel angle neutral point control is to maintain the steering wheel angle neutral point δh_zero, highly accurately. The steering wheel angle neutral point δh_zero is a reference value for calculating the correction steering wheel angle δh_cr, which is one of the input values of the steered wheel control unit 100A which takes charge of the actual tire steer angles control of the front and rear wheels, as is clear from FIG. 2. Therefore, if the accuracy of the steering wheel angle neutral point δh_zero is insufficient, the tire steer angle control of the front and rear wheels performed by the steered wheel control unit 100A cannot be accurately performed, especially if the steering wheel angle neutral point δh_zero has an abnormal value.

Here, the steering wheel angle neutral point δh_zero is influenced by the accuracy of the tire steer angle control of the front and rear wheels toward a tire steer angle neutral point. The tire steer angle neutral point is a tire steer angle when the vehicle travels straight. At the tire steer angle neutral point, the steering wheel 11 is supposed to be maintained in a steering holding state; however, if the detection accuracy of the VGRS rotation angle δvgrs and the ARS rotation angle δars is reduced in controlling the steered wheels to the tire steer angle neutral point, the steered wheels do not stop at the original tire steer angle neutral point. Thus, the driver who desires the straight travel performs an act of correcting the tire steer angle by providing the steering torque via the steering wheel 11.

On the other hand, the steering wheel angle neutral point δh_zero is the steering wheel angle when the vehicle travels straight, and thus, even if the correction of the tire steer angle by applying the steering torque as described above results in the straight-travel of the vehicle 10, the steering wheel angle at that time point is likely learned as the steering wheel angle neutral point δh_zero. In this case, in a state in which the driver holds the steering wheel 11, the vehicle 10 deflects to the left or to the right, which is not desirable in terms of vehicle behavior control. In other words, in order to maintain the accuracy of the steering wheel angle neutral point δh_zero, it is necessary to accurately deal with an abnormal state of the VGRS rotation angle sensor 17 and the ARS rotation angle sensor 20. In the embodiment, the steering wheel angle neutral point δh_zero is maintained, highly accurately, by the steering wheel angle neutral point control.

<Details of Steering Wheel Angle Neutral Point Control>

Figure 3:
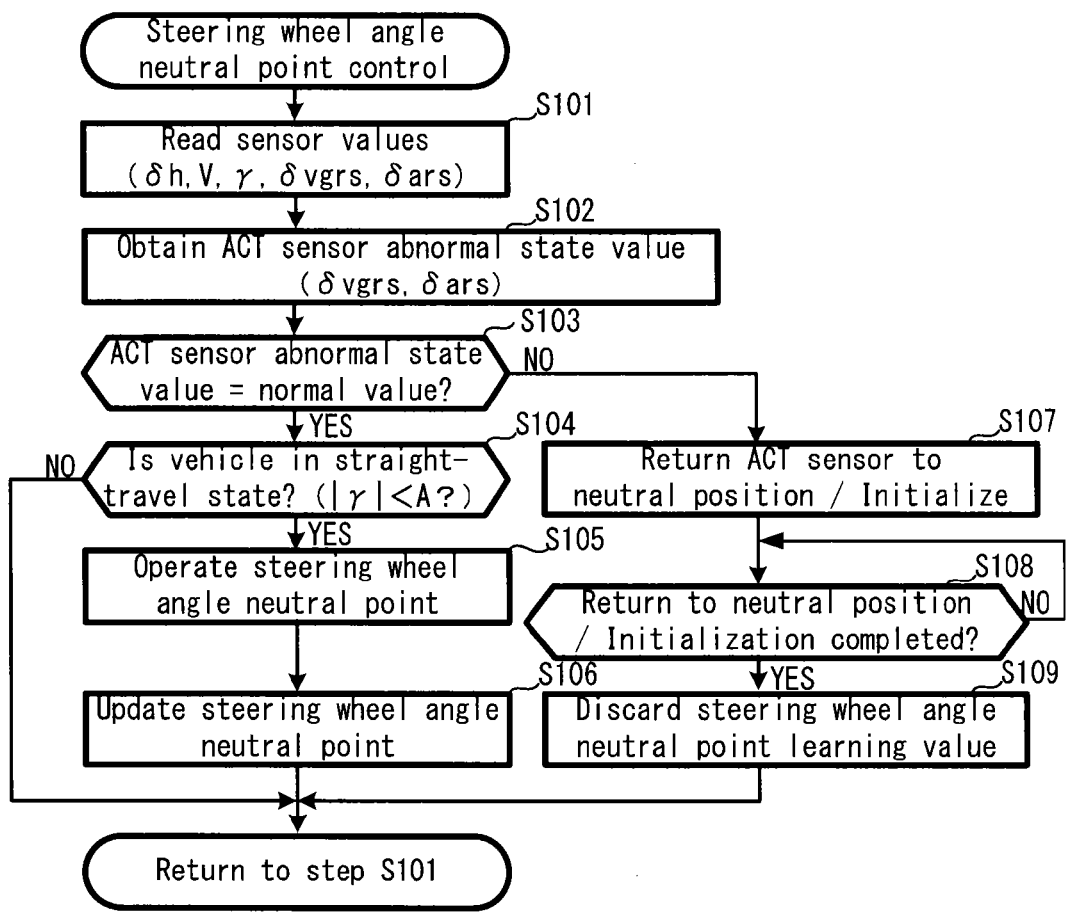
FIG. 3 is a flowchart illustrating steering wheel angle neutral point control performed by an ECU in the vehicle illustrated in FIG. 1.

Now, with reference to FIG. 3, an explanation will be given to the details of the steering wheel angle neutral point control. FIG. 3 is a flowchart illustrating the steering wheel angle neutral point control. Incidentally, the ECU 100 is provided with each of the apparatuses exemplified in FIG. 2; however, here, unless otherwise specified, the operation of the ECU 100 is written regardless of a difference in types of the apparatuses. Moreover, the vehicle 10 is provided with the VGRS rotation angle sensor 17 and the ARS rotation angle sensor 20 as the "steering wheel equivalent value detecting device" of the present invention; however, they are comprehensively expressed by a term of "ACT sensor", as occasion demands, in the sense of a sensor attached to each actuator.

In FIG. 3, the ECU 100 reads the sensor values detected by the various sensors (step S101). More specifically, the ECU 100 reads the steering wheel angle δh, the vehicle speed V, the yaw rate γ, the VGRS rotation angle δvgrs, and the ARS rotation angle δars.

Then, the ECU 100 obtains an ACT sensor abnormal state value, which defines whether the ACT sensor is in an abnormal state or in a normal state (step S102). Incidentally, the ACT sensor abnormal state value takes either a "normal value" which means that the ACT sensor is in the normal state, or an "abnormal value" which means that the ACT sensor is in the abnormal state, and is set by ACT sensor abnormal state updating which is performed in parallel with the steering wheel angle neutral point control.

Figure 4:
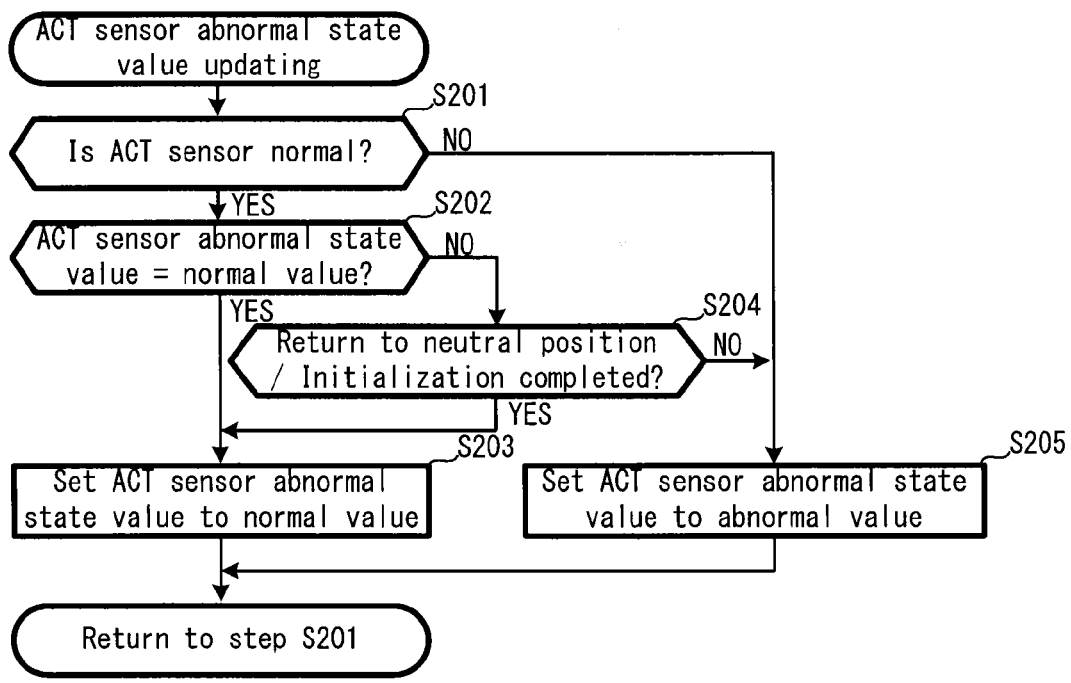
FIG. 4 is a flowchart illustrating ACT sensor abnormal state value updating, related to the control illustrated in FIG. 3.

Now, with reference to FIG. 4, an explanation will be given to the details of the ACT sensor abnormal state value updating. FIG. 4 is a flowchart illustrating the ACT sensor abnormal state value updating.

In FIG. 4, the ECU 100 determines or judges whether or not the ACT sensor is in the normal state (step S201). Here, the "normal state" means a state in which a detection value of the ACT sensor has a predetermined degree of reliability ensured. Whether or not the ACT sensor is in the normal state is determined from a comprehensive viewpoint of an operating state of the ACT sensor. More specifically, ECU 100 determines that the ACT sensor is in the abnormal state if the detection value of the ACT sensor is in a state of exceeding an appropriate range, diverging, having an invalid value, being not detected, having unstable output, hunting, or the like. Incidentally, there may be provided not only determination criteria exemplified here but also determination criteria which allow such a determination that the reliability of the ACT sensor is not ensured.

If the ACT sensor is in the abnormal state (step S201: NO), the ECU 100 sets the ACT sensor abnormal state value to the "abnormal value" (step S205). If the step S205 is performed, the processing is returned to the step S201.

On the other hand, if the ACT sensor is in the normal state (the step S201: YES), the ECU 100 determines whether or not the ACT sensor abnormal state value at a current time point is the "normal value" (step S202). If the ACT sensor abnormal state value at the current time point is the "normal value" (the step S202: YES), the ECU 100 sets the ACT sensor abnormal state value to the "normal value" (step S203). If the step S203 is performed, the processing is returned to the step S201.

Here, if the ACT sensor abnormal state value at the current time point (at which the ACT sensor is in the normal state) is the "abnormal value" (the step S202: NO), the ECU 100 determines whether or not a return to the neutral position and initialization of the ACT sensor, which will be described later, have been completed (step S204). If the return to the neutral position and the initialization have not been completed yet (the step S204: NO), the ECU 100 moves the processing into a step S205. In other words, the ACT sensor abnormal state value is maintained at the "abnormal value."

In the step S204, if the return to the neutral position and the initialization have been completed (the step S204: YES), the ECU 100 moves the processing into the step S203, and changes the ACT sensor abnormal state value to the "normal value". The ACT sensor abnormal state value updating is performed as described above.

Back in FIG. 3, the ECU 100 determines whether or not the ACT sensor abnormal state value is the "normal value" (step S103). If the ACT sensor abnormal state value is the "normal value" (the step S103: YES), the ECU 100 determines whether or not the vehicle 10 is in the straight-travel state (step S104). Incidentally, the determination of whether or not the vehicle is in the straight-travel state is performed by whether or not an absolute value of the yaw rate γ (which takes either a positive value or a negative value depending on a turning direction) is less than a reference value A. If the yaw rate γ is less than the reference value A, it is determined that the vehicle 10 is in the straight-travel state.

If it is determined that the vehicle 10 is in the straight-travel state (the step S104: YES), the ECU 100 operates or calculates the steering wheel angle neutral point δh_zero in accordance with the learning algorithm set in advance (step S105). The steering wheel angle neutral point δh_zero resulting from the operation or calculation is updated as the latest learning value (step S106). If the latest learning value of the steering wheel angle neutral point δh_zero is obtained, the processing is returned to the step S101. Moreover, in the step S104, if it is determined that the vehicle 10 is not in the straight-travel state (the step S104: NO), the processing is returned to the step S101. In other words, in this case, the steering wheel angle neutral point δh_zero is maintained at a previous value without the learning.

On the other hand, in the step S103, if the ACT sensor abnormal state value is the "abnormal value" (the step S103: NO), the ECU 100 returns the ACT sensor to the neutral position and initializes it (step S107).

Here, the "neutral position" associated with the ACT sensor is a neutral position which is a reference or a standard set in the ACT sensor in advance, and is not always a position corresponding to the tire steer angle neutral point of the vehicle. In initial setting, however, since the entire steering apparatus is established such that the vehicle 10 is in the straight-travel state at the neutral position, the corresponding tire steer angle is returned to the neutral position as the reference or standard, by driving the actuator corresponding to the ACT sensor which is in the abnormal state such that the ACT sensor is at the neutral position.

Moreover, the "initialization" associated with the ACT sensor is resetting for canceling the abnormal state. Incidentally, if the ACT sensor is so damaged that it cannot provide sufficient performance from a physical, mechanical, or electrical standpoint, the initialization hardly makes sense. In this case, the lighting of a warning lamp provided for the vehicle 10 is controlled quickly. The abnormality targeted in the embodiment is mainly an abnormality which temporarily occurs for some reasons.

The ECU 100 determines whether or not the tire steer angle corresponding to the ACT sensor which is in the abnormal state is returned to the neutral position (i.e. which unambiguously means that the ACT sensor is also at the neutral position) and the initialization of the ACT sensor has been completed (step S108). Incidentally, the processing in the step S108 is equivalent to the processing in the step S204 of the ACT sensor abnormal state value updating illustrated in FIG. 4. If the return to the neutral position of the tire steer angle and the initialization of the ACT sensor have not been completed (the step S108: NO), the processing is temporarily maintained in a standby state.

If the return to the neutral position of the tire steer angle and the initialization of the ACT sensor have been completed (the step S108: YES), i.e. if the vehicle 10 is provisionally in the straight-travel state and if the ACT sensor starts to function normally, then, the ECU 100 disregards the learning value of the steering wheel angle neutral point δh_zero held at that time point (step S109). If the learning value is disregarded, the processing is returned to the step S101. The steering wheel angle neutral point control proceeds as described above.

Here, since the ACT sensor abnormal state value is changed to the "normal value" at a time point at which the step S108 branches to the "YES" side, the determination in the step S103, which comes after the steering wheel angle neutral point δh_zero is disregarded, branches to the "YES" side. Moreover, since the return to the neutral position of the tire steer angle has been also completed, the vehicle 10 is provisionally maintained in the straight-travel state, and the determination in the step S104 also branches to the "YES" side.

As a result, the learning of the steering wheel angle neutral point δh_zero including the steps S105 and S106 is performed quickly. On the other hand, at this state, the initialization of the ACT sensor has been already completed, and the learning of the steering wheel angle neutral point is not influenced by an abnormal detection value outputted from the ACT sensor which is in the abnormal state. Moreover, a transient error during the return from the abnormal state or the like does not influence the learning of the steering wheel angle neutral point, either. In other words, in the abnormal determination of the ACT sensor, it is possible to learn the steering wheel angle neutral point δh_zero, quickly and highly accurately.

Incidentally, in the step S107, when the tire steer angle is returned to the neutral position on the basis of the neutral position of the ACT sensor, a change rate of the tire steer angle may be changed in multiple stages in accordance with a steering wheel angular velocity δh', which is a change rate of the steering wheel angle δh at that time point, or the vehicle speed V or the like. For example, the change rate of the tire steer angle may be changed to be higher and lower, in response to a large change and a small change of the steering wheel angular velocity δh', respectively. As described above, by changing the change rate of the tire steer angle in accordance with the travel state or steering state of the vehicle 10 at that time point, it is possible to prevent the driver from having an uncomfortable feeling, an uneasy feeling, and an unpleasant feeling.

On the other hand, apart from this, for legal reasons, there are restrictions in some cases in time required for a restart of the learning of the steering wheel angle neutral point δh_zero upon the determination of the abnormality of the ACT sensor. For example, in the vehicle behavior control, such as VSC, using the steering wheel angle neutral point δh_zero as a reference value, the lighting of the warning lamp is likely required or obligated if a period in which the vehicle behavior control cannot be performed is longer than or equal to a predetermined length. The lighting of the warning lamp is a large mental burden for the driver, and causes the uneasy feeling and the unpleasant feeling to be increased.

From the viewpoint as described above, it is practically useful to determine the learning value of the steering wheel angle neutral point δh_zero again as quickly as possible while preventing or suppressing the uncomfortable feeling, the uneasy feeling, or the unpleasant feeling which is generated in accordance with the change rate of the tire steer angle described above. In other words, the ECU 100 may control each actuator such that the processing associated with the step S107 is ended within a time limit obtained by back calculation from the various restrictions.

Second Embodiment

Figure 5:
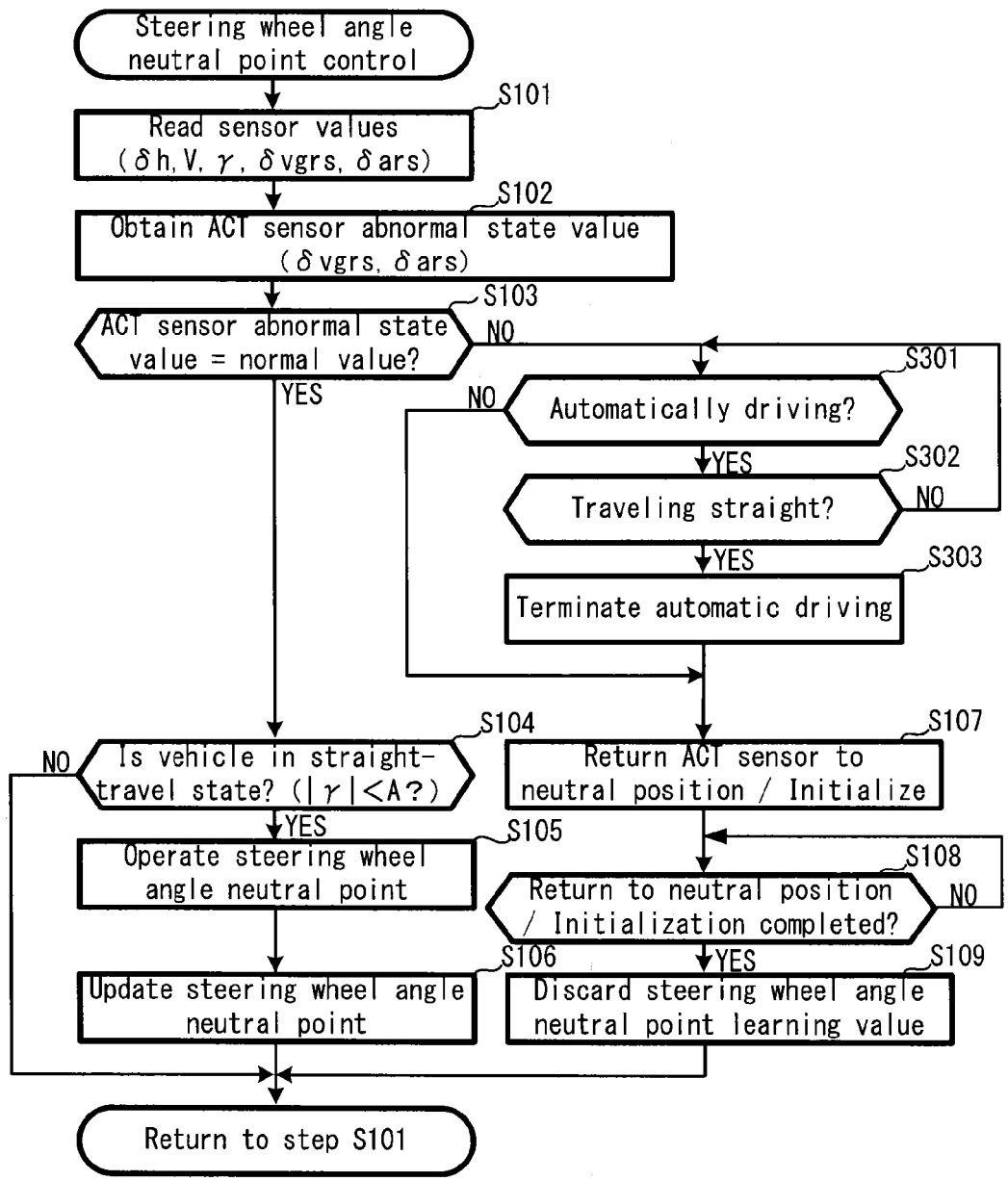
FIG. 5 is a flowchart illustrating steering wheel angle neutral point control in a second embodiment of the present invention.

Next, with reference to FIG. 5, an explanation will be given to the steering wheel angle neutral point control in a second embodiment of the present invention. FIG. 5 is a flowchart illustrating the steering wheel angle neutral point control. Incidentally, in FIG. 5, portions overlapping those of FIG. 3 will carry the same reference numerals, and an explanation thereof will be omitted as occasion demands.

The steering wheel angle neutral point control in the second embodiment is targeted for the vehicle 10 which can take an automatic driving state. Here, a practical aspect of automatic driving can apply various known aspects, and the details thereof will be omitted here. For example, trajectory following control, such as LKA, may be performed as a type of the automatic driving.

In this case, for example, a target value of lateral acceleration generated in a vehicle body may be determined on the basis of a yaw angle deviation between a vehicle body and a white line or a lane mark, which is imaged by an in-vehicle camera or the like, a radius (or a curvature) of a driving route, the yaw rate, or the like, and the operation of the various actuators, such as the VGRS actuator 300 and the ARS actuator 700, may be controlled so as to obtain the lateral acceleration corresponding to the determined target value. Moreover, in realizing the automatic driving state as described above, an assist of the steering torque performed by the steering torque assisting apparatus, such as the EPS actuator, may be accompanied.

In FIG. 5, if the ACT sensor abnormal state value is the "abnormal value" (the step S103: NO), the ECU 100 determines whether or not the vehicle 10 is automatically driving (step S301). If the vehicle 10 is not automatically driving (the step S301: NO), the processing is moved into the step S107, and the processing proceeds in the same manner as in the first embodiment.

On the other hand, if the vehicle 10 is automatically driving (the step S301: YES), the ECU 100 determines whether or not the vehicle 10 is traveling straight (step S302). If the vehicle is not traveling straight, such as in a case where the vehicle 10 is in a turning state in the process of the automatic driving control (the step S302: NO), the processing is returned to the step S301. In other words, in this case, the return to the neutral position of the ACT sensor and the initialization are temporarily in the standby state.

If the vehicle is traveling straight in the step S302 (the step S302: YES), the ECU 100 forcibly terminates the automatic driving (step S303), and moves the processing into the step S107.

As described above, according to the steering wheel angle neutral point control in the second embodiment, if the vehicle 10 is performing various automatic driving control, such as, for example, LKA, the tire steer angle is returned to the neutral position after the vehicle 10 becomes into the straight-travel state. Therefore, the destabilization of the vehicle behavior, the generation of the uncomfortable feeling, the uneasy feeling, and the unpleasant feeling of the driver, and similar actions, which are caused by rapidly returning the turning vehicle 10 to the straight-travel state, are suppressed in an automatic steering period in which the driver does not have the steering intention.

Incidentally, the "straight travel" in the step S302 may be a straight-travel state which is less strict than the straight-travel state obtained when the tire steer angle is at the neutral position. In other words, if the uncomfortable feeling, the uneasy feeling, or the unpleasant feeling is not given to the driver when the tire steer angle is returned to the neutral position, it may be determined that the vehicle is in the straight-travel state in cases where the vehicle is in small-scale turning operation.

Incidentally, a deviation or shift of the steering wheel angle neutral point can be caused by a hardly-predictable or unpredictable event, such as a drift of a sensor temperature and a contact with road-surface obstacle. Therefore, the learning of the steering wheel angel neural point needs to be performed all the time, and a clear effect is produced by the vehicle steering control apparatus of the present invention. The present invention also has a clear technical meaning.

The present invention is not limited to the aforementioned embodiments, but various changes may be made, if desired, without departing from the essence or spirit of the invention which can be read from the claims and the entire specification. A vehicle steering control apparatus, which involves such changes, is also intended to be within the technical scope of the present invention.

INDUSTRIAL APPLICABILITY

The present invention can be applied to a vehicle which is configured to change the steering angels of the steered wheels independently of the operation by the driver.

DESCRIPTION OF REFERENCE CODES

FL, FR, RL, RR wheel
10 vehicle 11 steering wheel
12 upper steering shaft
13 lower steering shaft
14 steering mechanism
15 steering wheel angle sensor
16 steering torque sensor
17 VGRS rotation angle sensor
18 vehicle speed sensor
19 yaw rate sensor
20 ARS rotation angle sensor
100 ECU
200 VGRS actuator
300 VGRS driving apparatus
400 EPS actuator
500 EPS driving apparatus
600 ARS actuator
700 ARS driving apparatus

The invention claimed is:

1. A vehicle steering control apparatus in a vehicle, the vehicle comprising:
   a tire steer angle varying apparatus which is configured to change a tire steer angle of steered wheels including at least one of front wheels and rear wheels, independently of steering wheel operation; and
   a tire steer angle equivalent value detecting device which is configured to detect a tire steer angle equivalent value corresponding to the tire steer angle, the tire steer angle equivalent value providing an operational criterion for the tire steer angle varying apparatus,
   said vehicle steering control apparatus comprising:
   a controller which is configured to
      learn a steering wheel angle neutral point,
      determine whether or not the tire steer angle equivalent value detecting device is in an abnormal state,
      control the tire steer angle varying apparatus such that the tire steer angle is returned to a tire steer angle neutral point if it is determined that the tire steer angle equivalent value detecting device is in the abnormal state,
      initialize the tire steer angle equivalent value detecting device after the tire steer angle is returned to the tire steer angle neutral point,
      disregard the learned steering wheel angle neutral point after (i) the tire steer angle is returned to the tire steer angle neutral point and (ii) the tire steer angle equivalent value detecting device is initialized, and
      restart the learning of the steering wheel angle neutral point after the tire steer angle equivalent value detecting device is initialized.

2. The vehicle steering control apparatus according to claim 1, wherein
   the vehicle further comprises a neutral position detecting device which is configured to detect a neutral position of the tire steer angle equivalent value detecting device corresponding to the tire steer angle neutral point, and
   said controller is further configured to return the tire steer angle to the tire steer angle neutral point on the basis of the detected neutral position.

3. The vehicle steering control apparatus according to claim 1, wherein said controller is further configured to control the tire steer angle varying apparatus such that the tire steer angle is returned to the tire steer angle neutral point within a predetermined time.

4. The vehicle steering control apparatus according to claim 1, wherein said controller is further configured to determine a change rate of the tire steer angle when the tire steer angle is returned to the tire steer angle neutral point on the basis of at least one of a steering wheel operating speed and a vehicle speed, and control the tire steer angle varying apparatus such that the tire steer angle is changed at the determined change rate.

5. The vehicle steering control apparatus according to claim 1, wherein said controller is further configured to control the tire steer angle varying apparatus such that the vehicle is in an automatic steering state on the basis of a driving condition set in advance, determine whether or not the vehicle is in a straight-travel state, disregard the learned steering wheel angle neutral point if it is determined that the vehicle is in the straight-travel state in a case where it is determined that the tire steer angle equivalent value detecting device is in the abnormal state in an automatic steering period in which the vehicle is in the automatic steering state, and return the tire steer angle to the tire steer angle neutral point if it is determined that the vehicle is in the straight-travel state in the case where it is determined that the tire steer angle equivalent value detecting device is in the abnormal state in the automatic steering period in which the vehicle is in the automatic steering state.

6. The vehicle steering control apparatus according to claim 1, wherein the controller is configured to determine whether or not the tire steer angle equivalent value detecting device is in the abnormal state if a detection value of the tire steer angle equivalent value detecting device exceeds a predetermined range, diverges, has an invalid value, or is not detected.

* * * * *